US012710088B2

(12) United States Patent
Austrheim et al.

(10) Patent No.: US 12,710,088 B2
(45) Date of Patent: Aug. 18, 2026

(54) BRACING ARRANGEMENT WITH DAMPER

(71) Applicant: Autostore Technology AS, Nedre Vats (NO)

(72) Inventors: Trond Austrheim, Etne (NO); Martin Fitje, Etne (NO); Børge Bekken, Haugesund (NO)

(73) Assignee: AutoStore Technology AS, Nedre Vats (NO)

( * ) Notice: Subject to any disclaimer, the term of this patent is extended or adjusted under 35 U.S.C. 154(b) by 180 days.

(21) Appl. No.: 18/551,488

(22) PCT Filed: Mar. 25, 2022

(86) PCT No.: PCT/EP2022/057915
§ 371 (c)(1),
(2) Date: Sep. 20, 2023

(87) PCT Pub. No.: WO2022/200567
PCT Pub. Date: Sep. 29, 2022

(65) Prior Publication Data

US 2024/0167533 A1 May 23, 2024

(30) Foreign Application Priority Data

Mar. 25, 2021 (NO) .................................... 20210390
Mar. 18, 2022 (NO) .................................... 20220334

(51) Int. Cl.
*F16F 15/04* (2006.01)
*A47B 96/14* (2006.01)
*B65G 1/04* (2006.01)

(52) U.S. Cl.
CPC .............. *F16F 15/04* (2013.01); *A47B 96/14* (2013.01); *B65G 1/0464* (2013.01); *F16F 2230/0041* (2013.01)

(58) Field of Classification Search
CPC .. F16F 15/04; F16F 15/00; F16F 15/02; F16F 2230/0041; A47B 96/14; B65G 1/0464;
(Continued)

(56) References Cited

U.S. PATENT DOCUMENTS 2,053,226 A * 9/1936 Ruge ..................... E04H 9/0237 52/693
2,963,127 A 12/1960 Manville
(Continued)

FOREIGN PATENT DOCUMENTS

CN 101238265 A 8/2008
FR 1458211 A 3/1966
(Continued)

OTHER PUBLICATIONS

International Search Report issued in PCT/EP2022/057915 on Dec. 20, 2022 (4 pages).

(Continued)

*Primary Examiner* — Nkeisha Smith
(74) *Attorney, Agent, or Firm* — Baker Botts L.L.P.

(57) ABSTRACT

A bracing arrangement is for a framework structure of an automated storage and retrieval system. The framework structure includes a rail system arranged at an upper level of the framework structure. The rail system includes a first set of parallel rails arranged in a horizontal plane and extending in a first direction, and a second set of parallel rails arranged in the horizontal plane and extending in a second direction which is orthogonal to the first direction, which first and second sets of rails form a grid pattern in the horizontal plane including a plurality of adjacent grid cells. Each grid cell includes a grid opening defined by a pair of neighboring rails of the first set of rails and a pair of neighboring rails of the second set of rails. The framework structure provides a
(Continued)

plurality of storage columns. Each column is arranged to store a respective stack of storage containers where the storage columns are located beneath the rail system and each storage column is located vertically below a grid opening. The rail system is arranged to guide a plurality of automated vehicles that operate on the rail system. The bracing arrangement includes an elongated, rigid bracing member, and a damping mechanism. The elongated, rigid bracing member is coupled at one end to the framework structure, at or near an upper level of the framework structure and at an opposite end to a grounding point. The damping mechanism is connected to an end of the bracing member. The damping mechanism is arranged to respond to forces from lateral movement in the upper level of the framework structure transferred to the damper mechanism via the elongated bracing member. The damping mechanism further includes a releasable locking mechanism which isolates the damping mechanism until a threshold force exerted on the locking mechanism via the bracing member is exceeded, such that after the threshold value is exceeded the releasable locking mechanism is tripped allowing the damper to dissipate kinetic energy from lateral movement of the upper level of the framework structure.

18 Claims, 16 Drawing Sheets

(58) Field of Classification Search
CPC ... B65G 2207/20; B61D 15/00; E04B 1/5831; E04H 12/10; E04H 12/22
USPC .......................................................... 248/568
See application file for complete search history.

(56) References Cited

U.S. PATENT DOCUMENTS 5,819,484 A * 10/1998 Kar ....................... E04H 9/0237 52/167.3
6,230,450 B1 * 5/2001 Kuroda ............... F16F 15/0235 52/167.1
6,389,778 B1 5/2002 Strange
6,530,182 B2 * 3/2003 Fanucci ................ E04H 9/0237 52/167.2
6,892,504 B1 5/2005 diGirolamo et al.
7,703,244 B2 * 4/2010 Suzuki ...................... E04B 1/24 403/217
9,080,339 B2 * 7/2015 Hayes ..................... E04H 9/024
12,180,743 B2 * 12/2024 Sitler ...................... E04H 9/024
12,252,898 B2 * 3/2025 Zhao ......................... E04H 9/02
2007/0227095 A1 10/2007 Hubbe
2007/0289230 A1 12/2007 Schroeder et al.
2009/0133338 A1 5/2009 Thompson et al.
2011/0146201 A1 6/2011 Vanker et al.
2016/0265217 A1 * 9/2016 Hayes .................. E04B 1/1903
2020/0318338 A1 10/2020 Austrheim
2020/0332511 A1 * 10/2020 Ishaq ........................ E04B 1/08
2023/0374811 A1 * 11/2023 Ozbulut ................ E04H 9/0237
2024/0026678 A1 * 1/2024 Chuang ................... F16F 9/145
2025/0084659 A1 * 3/2025 Kuroiwa ................. F16F 15/02
2025/0196971 A1 * 6/2025 Udoh ...................... B63B 21/20

FOREIGN PATENT DOCUMENTS

| | | | |
|---|---|---|---|
| JP | S6452963 | A | 3/1989 |
| JP | H08319667 | A | 12/1996 |
| JP | 2001012104 | A | 1/2001 |
| JP | 2001227587 | A | 8/2001 |
| JP | 2005325529 | A | 11/2005 |
| JP | 2007-197113 | A | 8/2007 |
| JP | 2017048584 | A | 3/2017 |
| NO | 317366 | B1 | 10/2004 |
| WO | 01/46531 | A2 | 6/2001 |
| WO | 2014/075937 | A1 | 5/2014 |
| WO | 2014/090684 | A1 | 6/2014 |
| WO | 2014/141905 | A1 | 9/2014 |
| WO | 2015/193278 | A1 | 12/2015 |
| WO | 2018/146304 | A1 | 8/2018 |
| WO | 2019/101367 | A1 | 5/2019 |
| WO | 2019/206487 | A1 | 10/2019 |

OTHER PUBLICATIONS

Written Opinion of the International Searching Authority issued in PCT/EP2022/057915 on Dec. 20, 2022 (8 pages).
Norwegian Search Report issued in No. 20210390, mailed on Oct. 25, 2021 (2 pages).
Hoffert, Rudi, Office Action in EP22718624.4, mailed Apr. 23, 2025, 4 pages, European Patent Office, Rijswijk, Netherlands.
Wang, Huanyu, Office Action in CN202280024707.9, mailed Jun. 19, 2025, 11 pages, The State Intellectual Property Office of the People's Republic of China, Beijing, China.
Marko Peltonen, Office Action for Norwegian Patent Application No. 20220334, dated May 16, 2024, 7 pages, pub. by Norwegian Industrial Property Office, Oslo, Norway.

* cited by examiner

BRACING ARRANGEMENT WITH DAMPER

FIELD OF THE INVENTION

The present invention relates to structural bracing, in particular to a bracing arrangement comprising a damper for absorbing and/or dissipating vibrations or impacts to a framework structure of an automated storage and retrieval system, and in particular to a bracing arrangement having a tension limiter that isolates a damper until a threshold tensile load is exceeded.

BACKGROUND AND PRIOR ART

FIG. 1 discloses a prior art automated storage and retrieval system 1 with a framework structure 100 and FIGS. 2, 3 and 4 disclose three different prior art container handling vehicles 201,301,401 suitable for operating on such a system 1.

The framework structure 100 comprises upright members 102 and a storage volume comprising storage columns 105 arranged in rows between the upright members 102. In these storage columns 105 storage containers 106, also known as bins, are stacked one on top of one another to form stacks 107. The members 102 may typically be made of metal, e.g. extruded aluminum profiles.

The framework structure 100 of the automated storage and retrieval system 1 comprises a rail system 108 arranged across the top of framework structure 100, on which rail system 108 a plurality of automated vehicles, for example container handling vehicles 201,301,401 may be operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301,401 in a first direction X across the top of the frame structure 100, and a second set of parallel rails 111 arranged perpendicular to the first set of rails 110 to guide movement of the container handling vehicles 201,301,401 in a second direction Y which is perpendicular to the first direction X. Containers 106 stored in the columns 105 are accessed by the container handling vehicles 201,301,401 through access openings 112 in the rail system 108. The container handling vehicles 201,301,401 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supporting.

Each prior art container handling vehicle 201,301,401 comprises a vehicle body 201*a*,301*a*,401*a* and first and second sets of wheels 201*b*, 201*c*, 301*b*, 301*c*,401*b*,401*c* which enable the lateral movement of the container handling vehicles 201,301,401 in the X direction and in the Y direction, respectively. In FIGS. 2, 3 and 4 two wheels in each set are fully visible. The first set of wheels 201*b*,301*b*, 401*b* is arranged to engage with two adjacent rails of the first set 110 of rails, and the second set of wheels 201*c*,301*c*,401*c* is arranged to engage with two adjacent rails of the second set Ill of rails. At least one of the sets of wheels 201*b*, 201*c*, 301*b*,301*c*,401*b*,401*c* can be lifted and lowered, so that the first set of wheels 201*b*,301*b*,401*b* and/or the second set of wheels 201*c*,301*c*,401*c* can be engaged with the respective set of rails 110, 111 at any one time.

Each prior art container handling vehicle 201,301,401 also comprises a lifting device for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301,401 so that the position of the gripping/engaging devices with respect to the vehicle 201,301,401 can be adjusted in a third direction Z which is orthogonal the first direction X and the second direction Y. Parts of the gripping device of the container handling vehicles 301,401 are shown in FIGS. 3 and 4 indicated with reference number 304,404. The gripping device of the container handling device 201 is located within the vehicle body 201*a* in FIG. 2 and is thus not shown.

Conventionally, and also for the purpose of this application, Z=1 identifies the uppermost layer available for storage containers below the rails 110,111, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=17, Y=1, Z=6. The container handling vehicles 201,301,401 can be said to travel in layer 7=0, and each storage column 105 can be identified by its X and Y coordinates. Thus, the storage containers shown in FIG. 1 extending above the rail system 108 are also said to be arranged in layer Z=0.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y- and Z-direction.

Each prior art container handling vehicle 201,301,401 comprises a storage compartment or space for receiving and stowing a storage container 106 when transporting the storage container 106 across the rail system 108. The storage space may comprise a cavity arranged internally within the vehicle body 201*a*,401*a* as shown in FIGS. 2 and 4 and as described in e.g. WO2015/193278A1 and WO2019/206487A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The cavity container handling vehicle 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the cavity container handling vehicles 401 may have a footprint which is larger than the lateral area defined by a storage column 105 as shown in FIGS. 1 and 4, e.g. as is disclosed in WO2014/090684A1 or WO2019/206487A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail 110,111 may comprise two parallel tracks. In other rail systems 108, each rail in one direction (e.g. an X direction) may comprise one track and each rail in the other, perpendicular direction (e.g. a Y direction) may comprise two tracks. Each rail 110,111 may also comprise two track members that are fastened together, each track member providing one of a pair of tracks provided by each rail.

WO2018/146304A1, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301,401 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. The transportation from the port to the access station may require movement along various different directions, by means such as delivery vehicles, trolleys or other transportation lines. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301,401 can drop off storage containers 106 to be transported to an access or a transfer station, and the second port column 120 may be a dedicated pick-tip port column where the container handling vehicles 201,301,401 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301,401 is instructed to retrieve the target storage container 106 from its position and transport it to the drop-off port column 119. This operation involves moving the container handling vehicle 201,301,401 to a location above the storage column 105 in which the target storage container 106 is positioned, retrieving the storage container 106 from the storage column 105 using the container handling vehicle's 201,301,401 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201,301,401 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201, 301,401 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201,301,401 positions the storage container 106 at the desired position. The removed storage containers 106 may then be lowered back into the storage column 105, or relocated to other storage columns 105.

For monitoring and controlling the automated storage and retrieval system 1, e.g. monitoring and controlling the location of respective storage containers 106 within the framework structure 100, the content of each storage container 106, and the movement of the container handling vehicles 201,301,401 so that a desired storage container 106 can be delivered to the desired location at the desired time without the container handling vehicles 201,301,401 colliding with each other, the automated storage and retrieval system 1 comprises a control system 500 which typically is computerized and which typically comprises a database for keeping track of the storage containers 106.

Bracing of the Framework Structure

The framework structure 100 may be subjected to significant lateral forces, such as by the motion of the vehicles operating on the rail system 108. The framework structure 100 may also be subjected to tremors or other destabilizing forces. The framework structure therefore generally requires bracing. The framework structure 100 is typically braced by beams 501 connecting the uppers rails of the rail system to the walls of the building in which the framework structure is erected, as shown in prior art FIG. 4. Typically beams 501 are arranged on at least two sides of the framework structure, spaced approximately every 10 meters. In this instance, the normal, prior art upright members 102 are also arranged along the periphery of the framework structure, as illustrated in prior art FIG. 5.

It is not always possible or desirable to brace the framework structure 100 as described above, however. Furthermore, the above described bracing arrangement does not provide a grid that is self-standing, i.e. one that does not require bracing against an external structure.

In another example from the prior art, the present applicant has previously described in WO 2019101367 a system whereby a plurality of inclined supporting struts is connected between adjacent pairs of upright members 102 along the periphery of the framework structure.

Friction Dampers

In the field of building construction, friction dampers for absorbing and dissipating energy from earthquakes, impacts and the like are known. Known dampers are generally arranged to provide their damping effect from the very onset of external forces affecting a building. Such damping effect is often accompanied by a sway or other movement to the structure. In the context of an automated storage and retrieval system as described above, this is not optimal. The vehicles operating on the tracks of the system require the framework structure of an automated storage and retrieval system to remain relatively rigid. This relative rigidity must be maintained despite the vehicles themselves exerting lateral forces on the framework from braking and accelerating. A damper that absorbs energy from the very onset of such forces would thus permit an undesirable movement in the framework structure by virtue of absorbing and dissipating the energy introduced by the vehicles themselves.

SUMMARY OF THE INVENTION

The present invention is set forth and characterized in the independent claims, while the dependent claims describe other characteristics of the invention.

The present invention provides a bracing arrangement for a framework structure comprising a damper mechanism for dissipating and/or absorbing kinetic energy from forces such as earthquakes, impacts and the like. The bracing arrangement further comprises a tension limiter that isolates the damper mechanism until a threshold value of tensile force is exceeded, thereby allowing the framework structure to remain relatively rigid until the threshold tensile value is exceeded. In one aspect, the framework structure is part of an automated storage and retrieval system that comprises automated vehicles operating on a rail system at an upper level of the framework structure, and the threshold value of the tension limiter is predetermined to isolate the damper mechanism in the face of kinetic energy introduced by the normal operation of the vehicles (as well as external forces of a similar magnitude), but which begins to absorb and dissipate kinetic energy when forces exerted on the framework structure exceed the threshold.

In one aspect, the invention comprises a damping mechanism attached to one or both ends of one or more elongated, rigid bracing members, such as a bracing rod, a bracing bar and the like. One end of each such bracing member is attached at or near the upper level of a framework structure of an automated store and retrieval system as described above. In one embodiment the bracing members are arranged diagonally, attached at their upper end to the upper level of the framework and attached at their lower end to the floor of the facility. In one embodiment, two such members cross to form an "X" pattern along a side of the framework structure.

In one embodiment, the damping mechanism comprises a bolt connected to the end of the bracing member, the bolt being arranged to compress a spring if the bolt moves in a longitudinal direction. In the event of lateral movement of the upper level of the framework, such movement will be transferred via the bracing member to the bolt, causing the bolt to move longitudinally, thereby compressing the spring. The compression and associated friction of the spring converts kinetic energy to heat, dissipating the kinetic energy according to principles well known to one skilled in the art of friction dampers.

The present invention is characterized according to one aspect in that the damper is isolated by a tension limiter, which prevents lateral forces exerted on the framework structure from being transferred to the damping mechanism until a threshold tensile value is exceeded. In one embodiment the tension limiter comprises a releasable locking mechanism that prevents the bolt of the damping mechanism from moving longitudinally (and thus prevents the bolt from compressing the spring) until a threshold value of force is exerted on the locking mechanism.

In one embodiment, the locking mechanism comprises a detent, such as a spring loaded detent. According to one aspect the spring loaded detent is a ball detent where a ball is forced by a set spring into a notch in the bolt. The set spring forces the ball into the notch with a predetermined force, preventing the bolt from moving longitudinally until the force transferred via the bracing member exceeds the force of the set spring. When the force of the set spring is exceeded, the bolt presses the ball back against its set spring, dislodging the ball from the notch and thereby allowing the bolt to move and compress the spring.

According to another embodiment, the locking mechanism is a breakable pin with a predetermined breaking force.

According one aspect, the threshold value for the locking mechanism, e.g. the amount of force required to dislodge the ball from the notch or to break the pin, is calculated based on the anticipated kinetic energy introduced by the normal operation of the vehicles operating in the automated storage and retrieval system. One skilled in the art is capable of calculating such kinetic energy by knowing the number of vehicles in operation, the weight of the vehicles, the rate of acceleration and deceleration of the vehicles, as well as other relevant parameters. According to one aspect, the threshold value is 500 N (Newtons).

According to one aspect, the damping arrangement of the invention dissipates energy according to the following formula E=F×S, where E is energy measured in Joules, F is force measured in Newtons, and S is stroke length of the bracing member, e.g.:

$$F=1000N\text{–Stroke}=5\text{ mm } E=5\text{ Joule}$$

$$F=1000N\text{–Stroke}=30\text{ mm } E=300\text{ Joule}$$

According to one aspect, the present invention comprises a bracing arrangement for use in an automated storage and retrieval system as described in the background section above, and characterized in that the bracing arrangement comprises:

an elongated, rigid bracing member coupled at one end to the framework structure, at or near an upper level of the framework structure and at an opposite end to a grounding point;

a damping mechanism connected to an end of the bracing member, the damping mechanism comprising a spring that is compressible and extendable in a longitudinal direction of the bracing member, the compression of the spring being responsive to tension forces transferred to the spring via the elongated member in response to lateral movement in the upper level of the framework structure, the damping mechanism further comprising a tension limiter comprising a releasable locking mechanism which isolates the damping mechanism until a threshold tensile load is reached in the bracing member, in order to prevent the spring of the damping mechanism from extending or contracting until that threshold tensile load is exceeded, such that after the threshold tensile load has been exceeded the releasable locking mechanism is tripped allowing the spring to compress and extend, thereby dissipating kinetic energy from lateral movement of the upper level of the framework structure.

According to one embodiment, the framework structure is provided with a plurality of twin-post upright members arranged in at least one row of the framework structure, the twin-post upright members comprising a pair of vertical sections arranged with a space therebetween. The elongated bracing member is connected at a first end to a first connection point and at a second end to a second connection point in order to brace the framework structure, and each such elongated bracing member is arranged to pass through the spaces between the vertical sections of the twin-post upright members arranged in the at least one row. According to another embodiment, the vertical sections of the twin-post upright members are separated by spacers so as to create the space therebetween, and said twin-post upright members comprise corner guide profiles arranged to guide the corners of a storage container.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
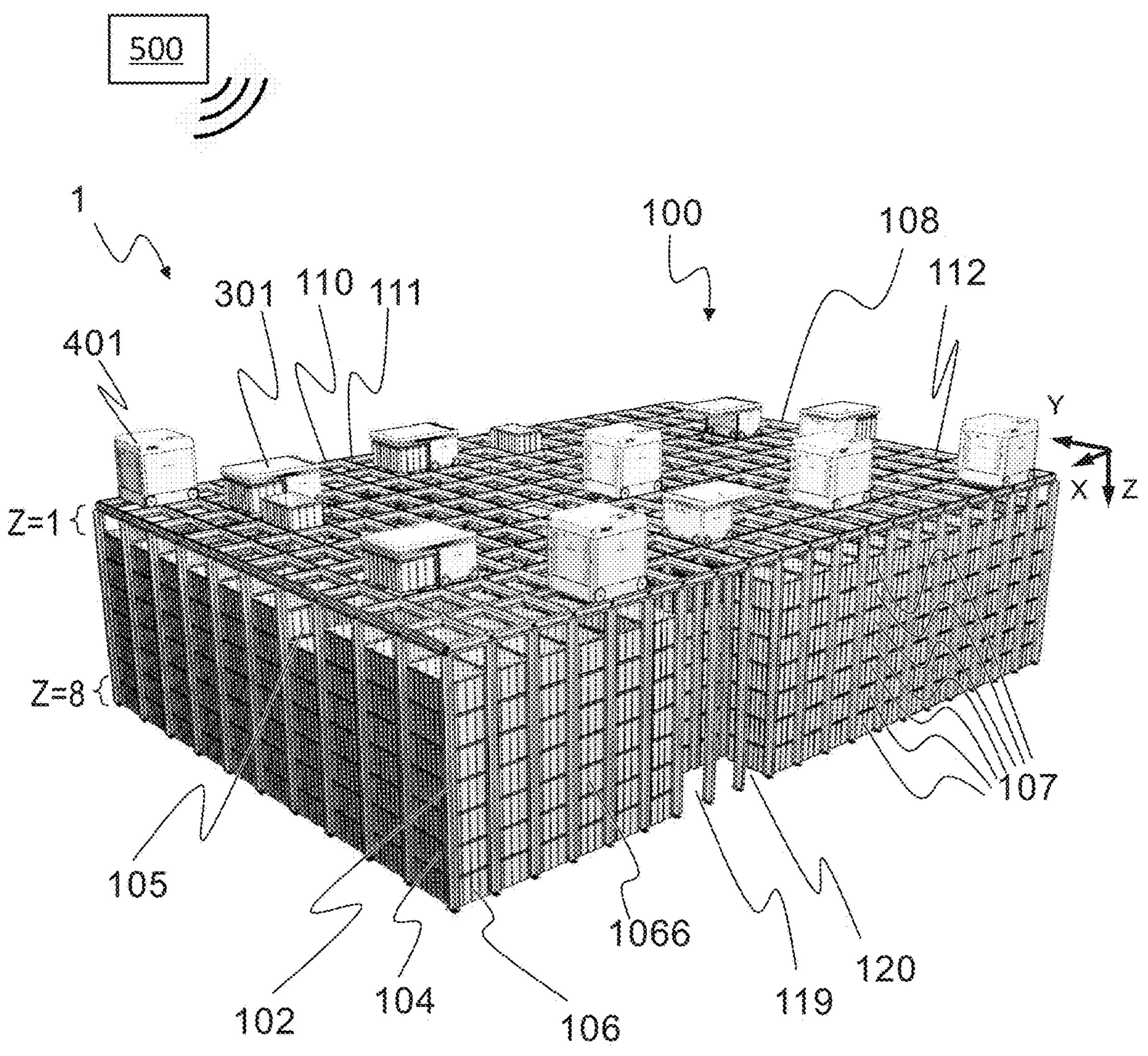
FIG. 1 is a perspective view of a framework structure of a prior art automated storage and retrieval system.
Figure 2:
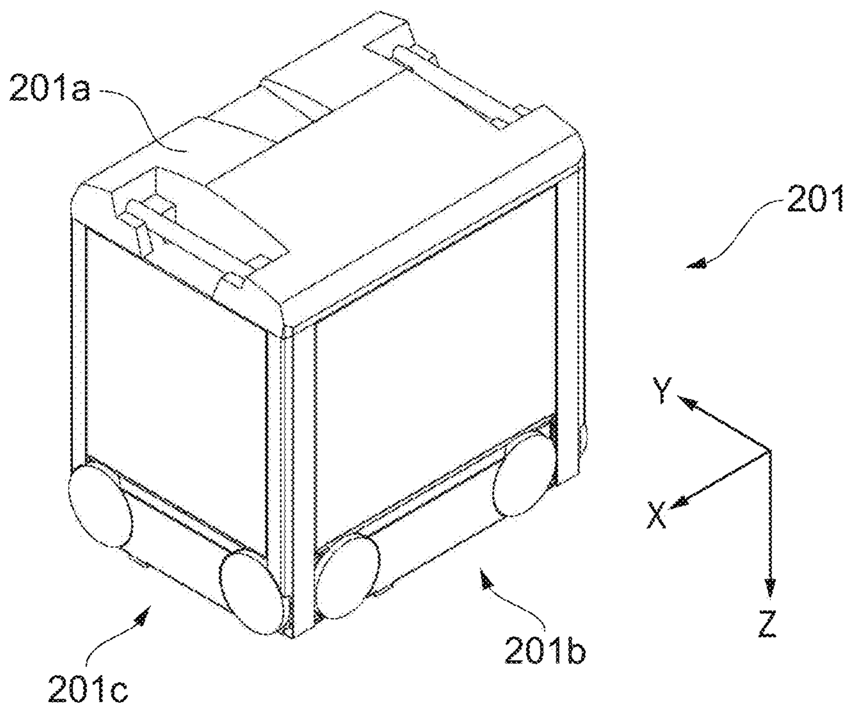
FIG. 2 is a perspective view of a prior art container handling vehicle having an internally arranged cavity for carrying storage containers therein.
Figure 3:
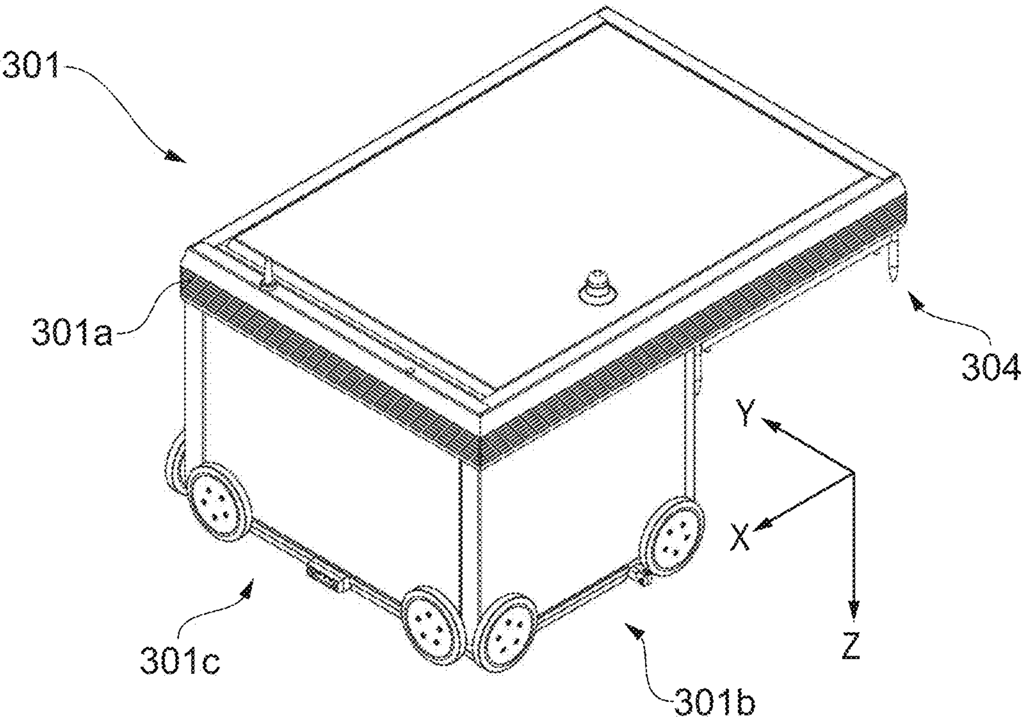
FIG. 3 is a perspective view of a prior art container handling vehicle having a cantilever for carrying storage containers underneath.
Figure 4:
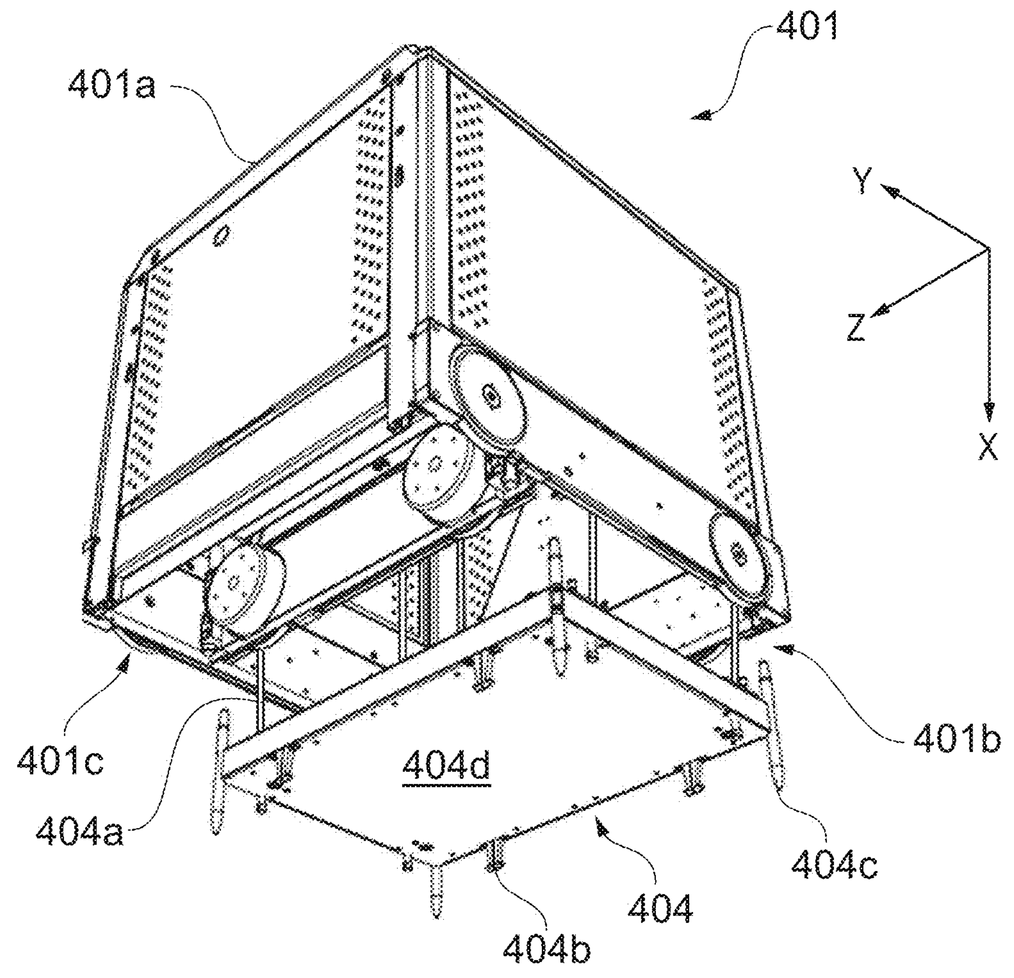
FIG. 4 is a perspective view, seen from below, of a prior art container handling vehicle having an internally arranged cavity for carrying storage containers therein.
Figure 5:
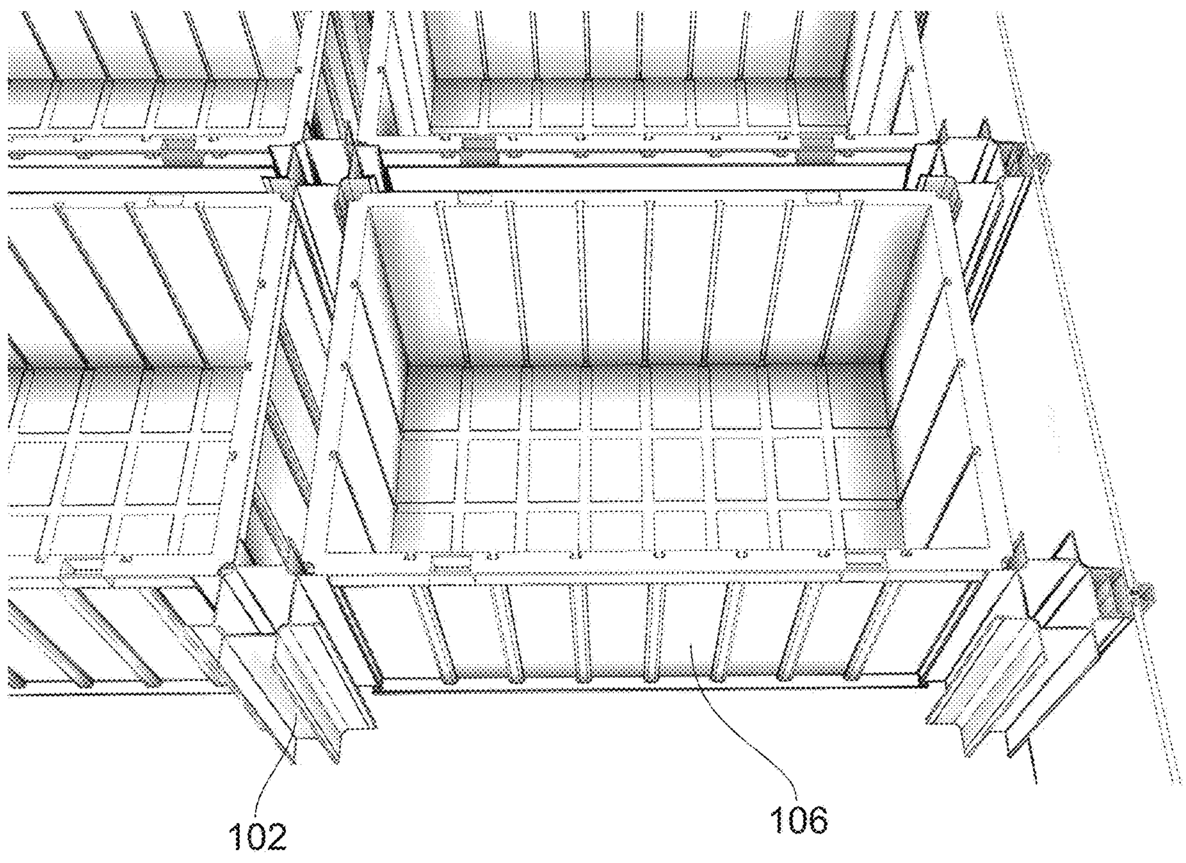
FIG. 5 is a view of prior art upright members arranged at the periphery of a framework structure.

In the following, embodiments of the invention will be discussed in more detail with reference to the appended drawings. It should be understood, however, that the drawings are not intended to limit the invention to the subject-matter depicted in the drawings.

The bracing arrangement according to one aspect of the present invention is utilized in connection with an automated storage and retrieval system 1 as described in the background section above. The framework structure 100 of the automated storage and retrieval system 1 is constructed in a similar manner to the prior art framework structure 100 described above in connection with FIGS. 1-5. That is, the framework structure 100 comprises a number of upright members 102, and comprises an upper rail system 108 extending in the X direction and Y direction upon which travel automated vehicles of the system.

The framework structure 100 further comprises storage compartments in the form of storage columns 105 provided between the upright members 102 wherein storage containers 106 are stackable in stacks 107 within the storage columns 105. The upright members 102 have corner guide profiles that guide the corners of a container as it is lifted into or out of a storage column.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

Further aspects of the bracing arrangement according to the present invention will now be discussed in more detail with reference to FIGS. 6-17.

The bracing arrangement comprises a damper mechanism 502 connected to at least one end of an elongated, rigid bracing member 504. The invention will be described below in relation to embodiments where one damper mechanism is connected to one end of the bracing member, however one skilled in the art will recognize that a damper mechanism may be arranged at both ends of the elongated bracing member.

Figure 6:
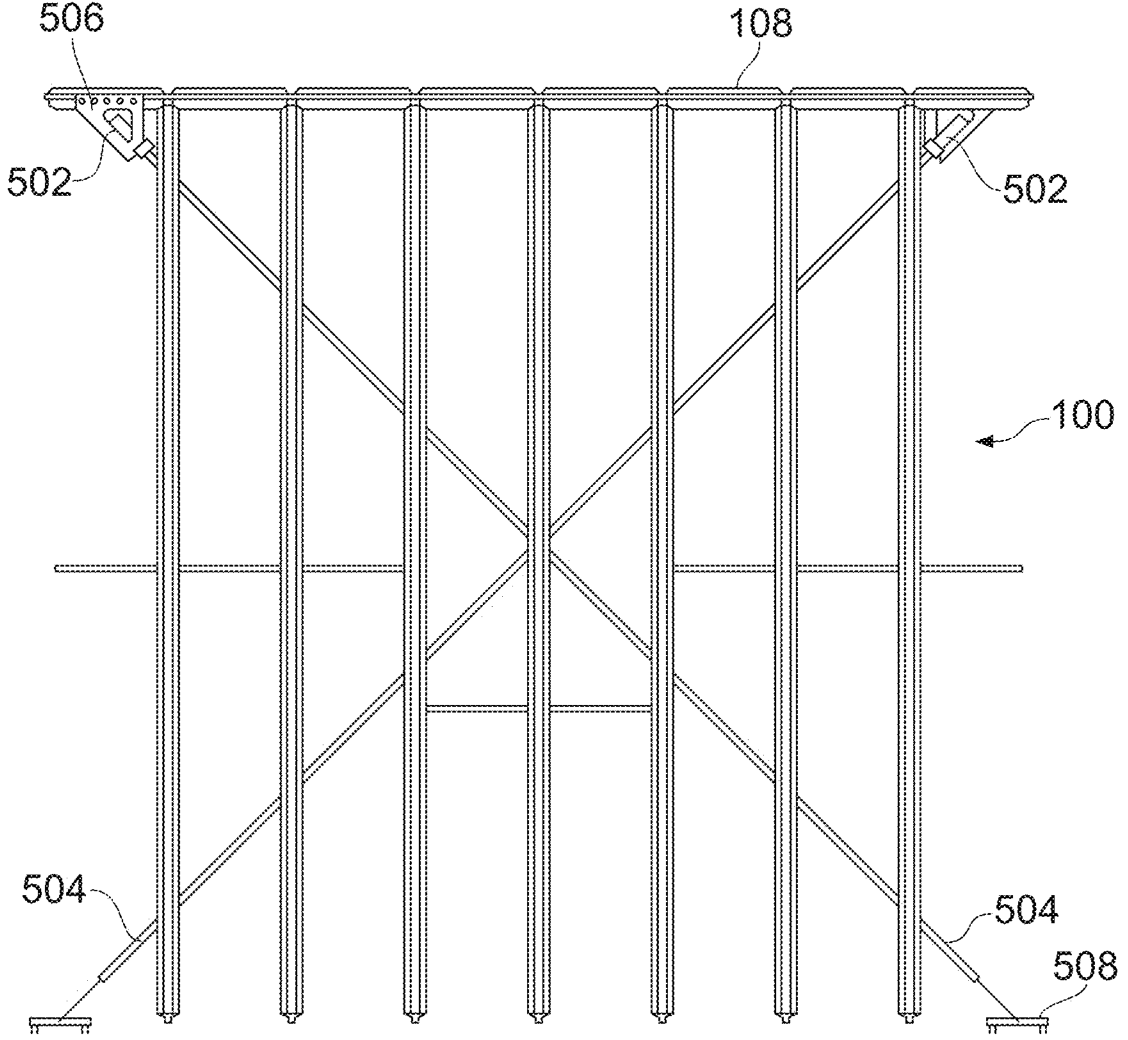
FIG. 6 is a side elevational view of an embodiment of the bracing arrangement according to the invention, with damper and tension limiter attached at one end of a bracing member to an upper portion of the framework structure and to the other end of the bracing member to a connection point on the floor of the facility.
Figure 7:
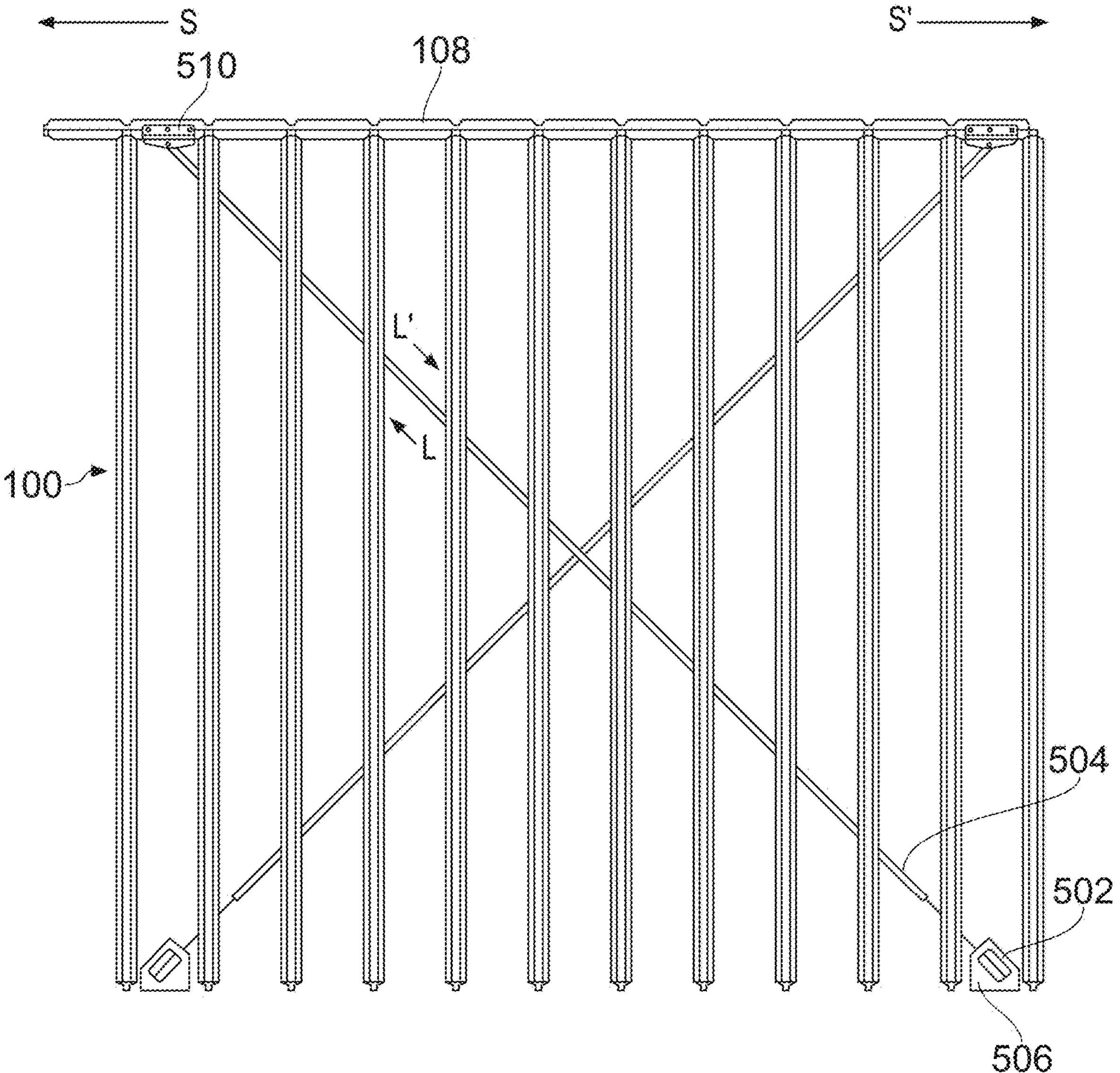
FIG. 7 is a side elevational view of a bracing arrangement according to another embodiment of the invention, with damper and tension limiter attached at one end of a bracing member to the floor of the facility and the other end of the bracing member attached to an upper portion of the framework structure.
Figure 8:
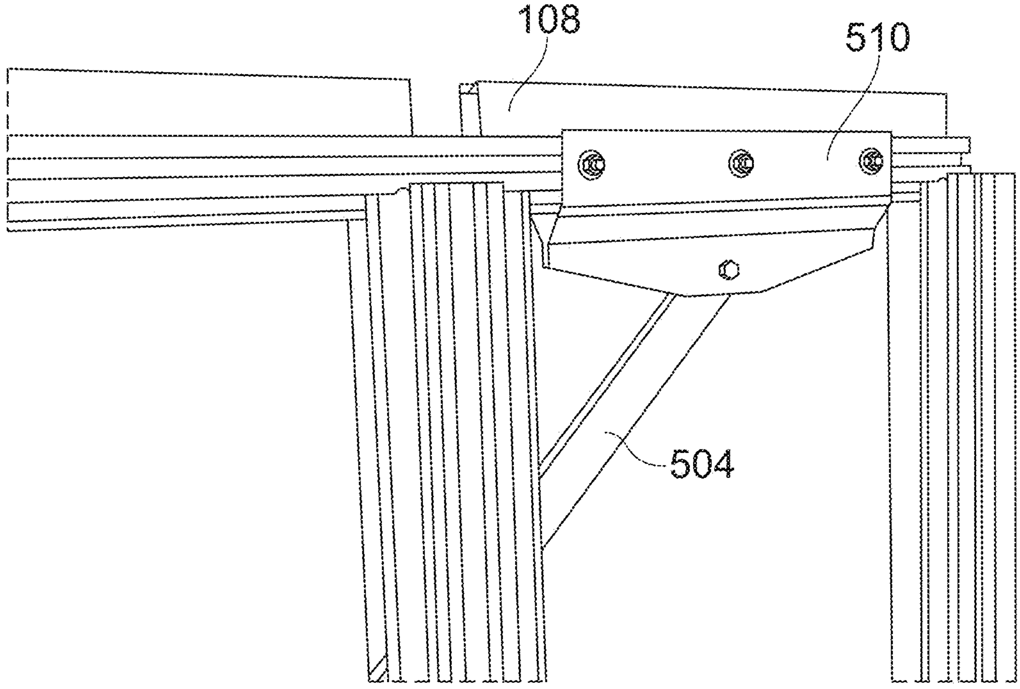
FIG. 8 is a perspective view of a connection bracket.
Figure 9:
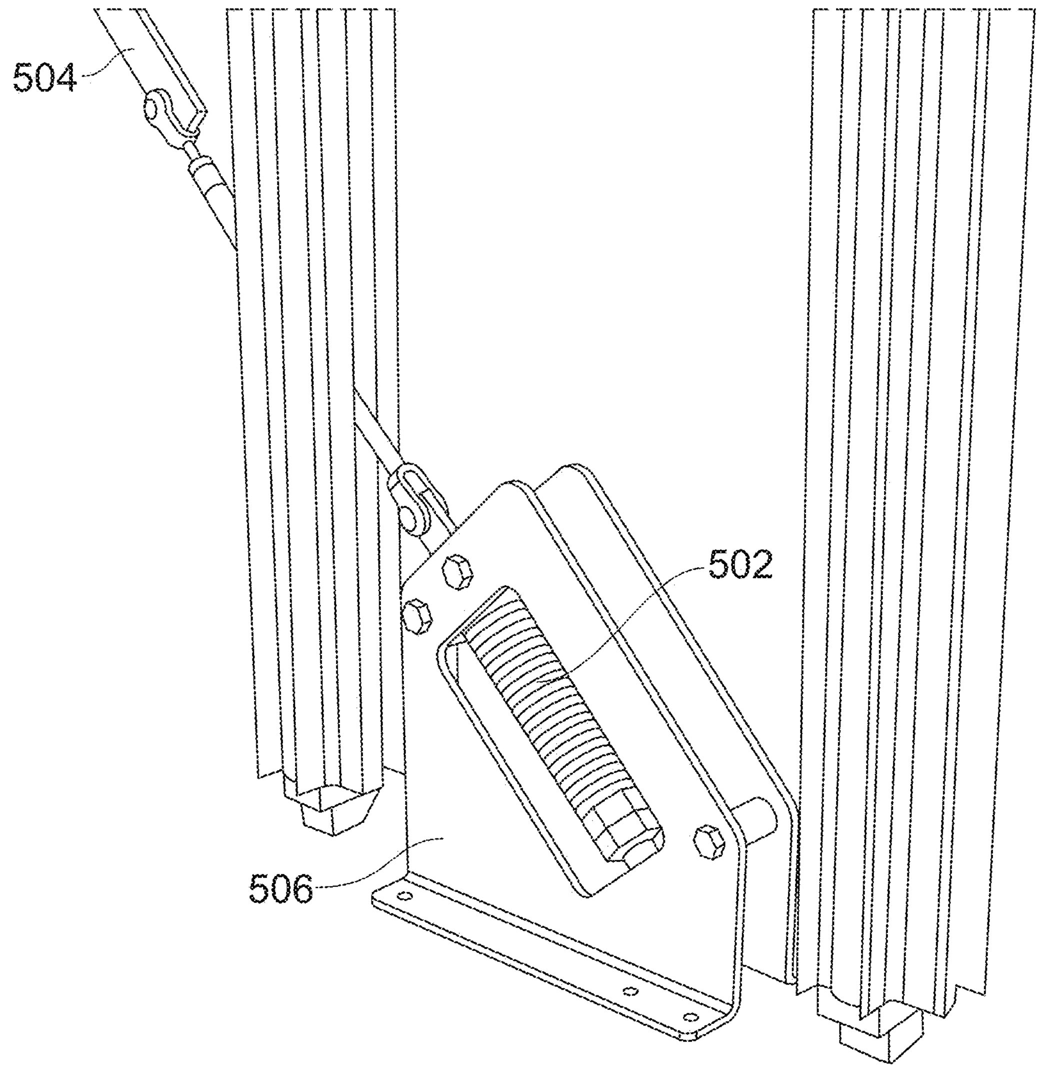
FIG. 9 is a detailed view of the damper and tension limiter attached to the floor.

Bracing member 504 may be rod-shaped with a circular cross section, a bar or strut with rectangular cross-section, or any other appropriate cross section. The elongated bracing member with damper mechanism is connected between an upper part of the framework structure and a grounding point, such as a connection point at or near the floor of the facility in which the framework structure is installed. In one embodiment, the upper part of the framework structure is the rail system 108. In one embodiment shown in FIGS. 6,11,12 and 13 the damper mechanism 502 is connected by a damper frame 506 to rail system 108 and the opposite end of the elongated bracing member 504 is connected to a connection point 508 at the floor of the facility. In an embodiment shown in FIGS. 7, 8, 9, 10 and 14 the damper frame 506 is connected to the floor while a connection bracket 510 connects the opposite end of the elongated bracing member 504 to the rail system 108. As seen in FIGS. 6 and 7, two elongated bracing members may be arranged along a section of the framework structure 100 in an “X” pattern. The bracing arrangement may comprise a plurality of such elongated bracing members/dampers arranged at various locations on the framework structure.

Figure 10:
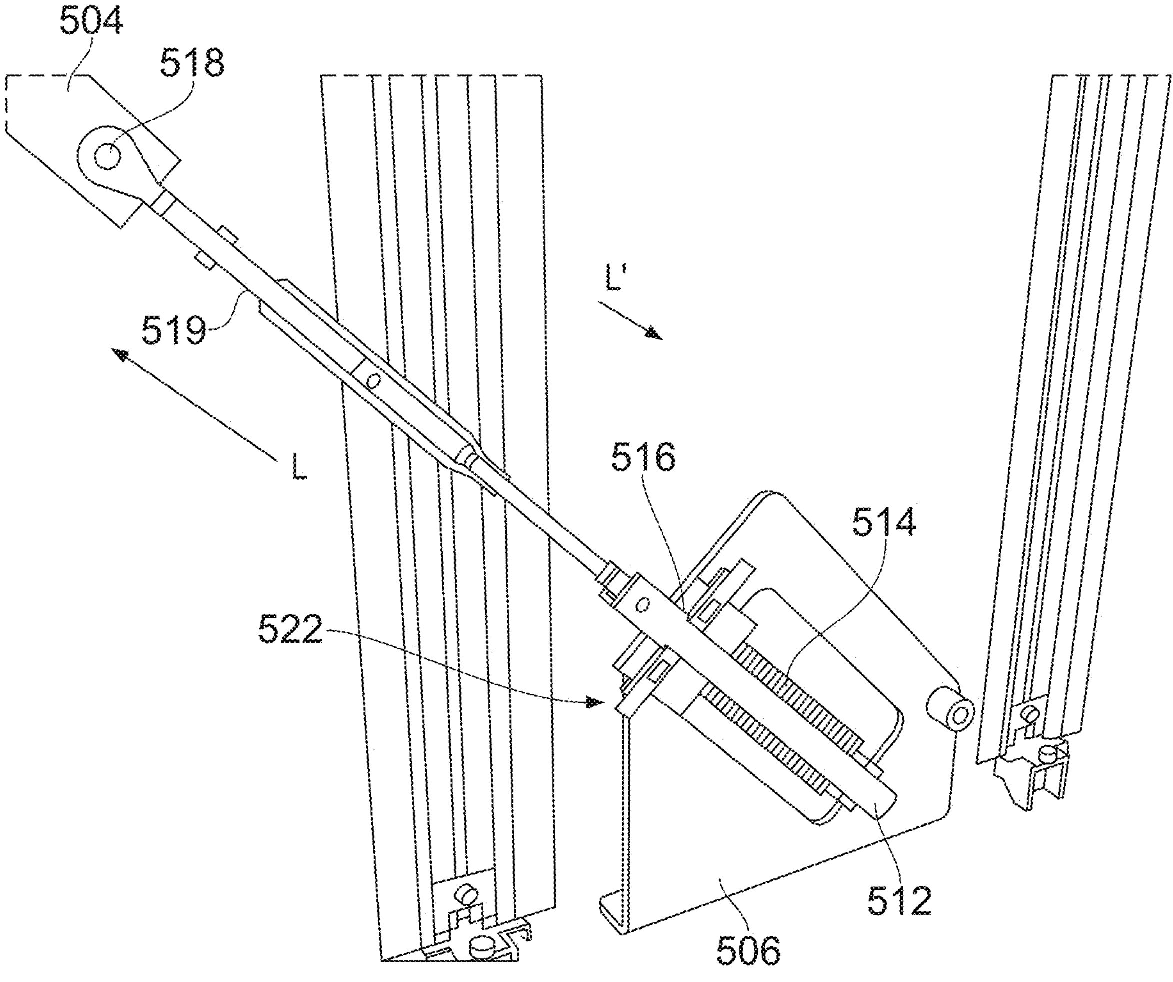
FIG. 10 is a cross section view of the structures from FIG. 9.
Figure 11:
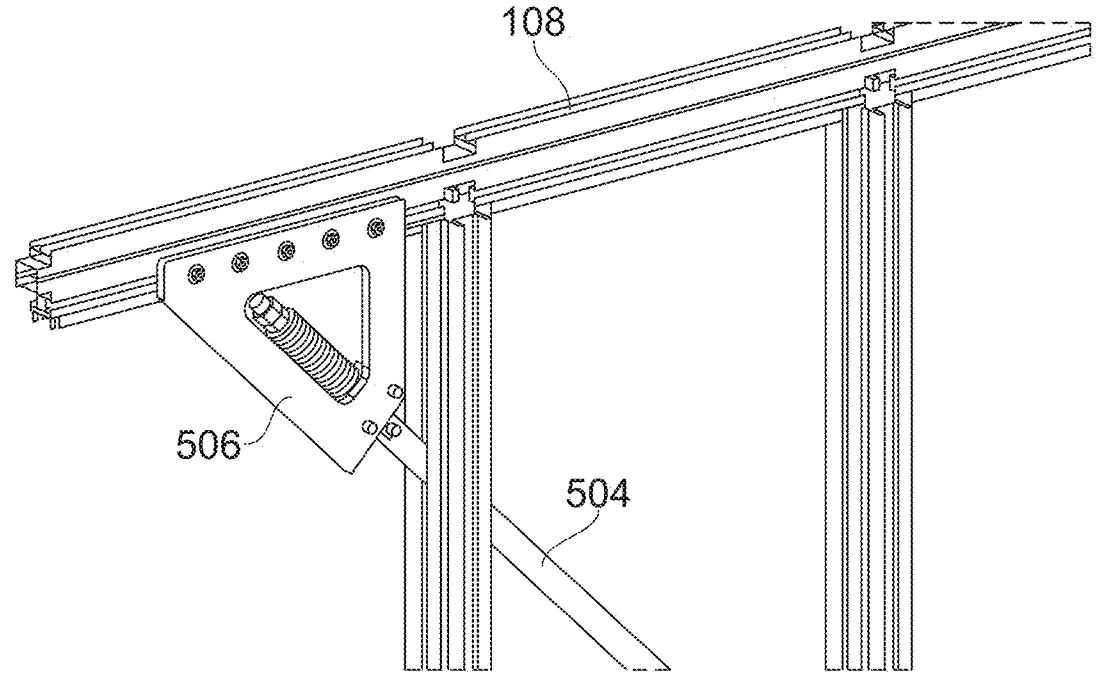
FIG. 11 is a detailed view of the damper and tension limiter attached to an upper portion of the framework structure.
Figure 12:
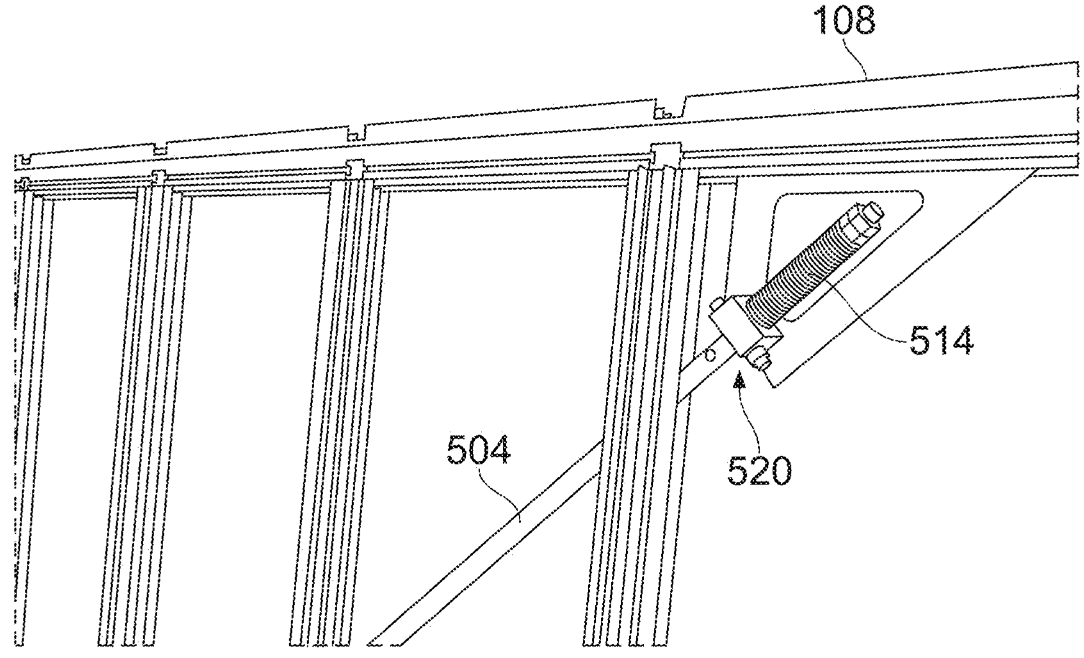
FIG. 12 is partial cut away view of the damper and tension limiter attached to an upper portion of the framework structure.

Damper mechanism 502 is preferably a friction damper and in one embodiment as shown in FIG. 10 the damping mechanism comprises a bolt 512 connected to the end of the bracing member 504, the bolt being arranged to compress a spring 514 if the bolt moves in a longitudinal direction L, the spring expanding back towards its original state when bolt 512 moves in direction L'. Oscillating compression and expansion of spring 514 may be used to dissipate kinetic energy according to principles familiar to one skilled in the art of friction dampers.

One potential cause of such a longitudinal movement of bolt 512 in longitudinal directions L and U would be a lateral movement of the upper part of the framework structure such as may be caused by forces from an earthquake, impacts or the like. Such potential movement is illustrated in FIG. 7 in directions S and S'. Forces tending to cause lateral movement of the upper part of framework structure 100 in direction S would apply tension forces to elongated bracing member 504 in direction L while forces tending to cause lateral movement in direction S' would apply compression forces to elongated bracing member 504 in direction L'. In the event the upper part of the framework moves in direction S, then the distance between the upper and lower connection points for elongated member 504 would increase, thereby resulting in compression of spring 514 to compensate for such increased distance. If the upper part of the framework structure moves in direction S', the distance between the upper and lower connection points for elongated member 504 would decrease. Movement of bolt 512 in direction L' past an original starting/locked position is not desirable in all embodiments of friction dampers however, in which case bolt 512 may be equipped with a shoulder 516 as shown in FIG. 10 that abuts a part of damper frame 506 to prevent bolt 512 from moving in longitudinal direction L' past an initial locked position. Bolt 512 is in this instance connected to the end of longated member 504 by a swivel joint 518 at the end of a turnbuckle 519. When the distance between upper and lower connection points for an elongated member decreases, the swivel joint 518 buckles in order to compensate for the decreased distance.

As can be appreciated by the discussion above, the operation of a friction damper is often associated with an oscillating movement of the structure being protected by the damper. For example, referring to FIG. 7 such oscillating movement could be lateral movement between directions S and S'. In the case of an automated storage and retrieval system as described above, such oscillating movement would often interfere with the operation of the vehicles on the rail system of the framework structure. This is a relatively minor consideration in the face of an earthquake where protection of the integrity of the framework structure has a higher priority that operation of the vehicles. However, the operation of the vehicles on the rails of the system will itself impart lateral forces on the framework due for example to the acceleration and braking of the vehicles. This is one of the reasons a framework structure must be braced, in order to retain an operational rigidity in the face of such self-imparted forces. As used herein, the term “operational rigidity” means a relative rigidity of the framework structure within acceptable operational parameters for the vehicles, such parameters depending on the type of vehicles and known to one skilled in the art of automated vehicles operating on a rail system.

Therefore it is important that the damper mechanism of the present invention does not impart or permit lateral movement of the upper part of the framework structure outside of its operational rigidity during normal operation of the storage and retrieval system. Therefore, according to one aspect of the present invention the damper is isolated by a tension limiter 520, which prevents activation of the damper until a threshold tension value is exceed.

The tension limiter 520 comprises a releasable locking mechanism 522 that prevents bolt 512 from moving in direction L until a threshold tension value is exceed. As discussed above with reference to FIG. 7, such tension may be the result of forces tending to move an upper part of framework structure 100 in direction S. When releasable locking mechanism 522 is in a locked state the bolt 512 is prevented from moving longitudinally in direction L from its locked position. If tension on bolt 512 exceeds the threshold value of the releasable locking mechanism, the bolt 512 is free to move in direction L and compress and release spring 514, with the resultant dissipation of kinetic energy.

Figure 13:
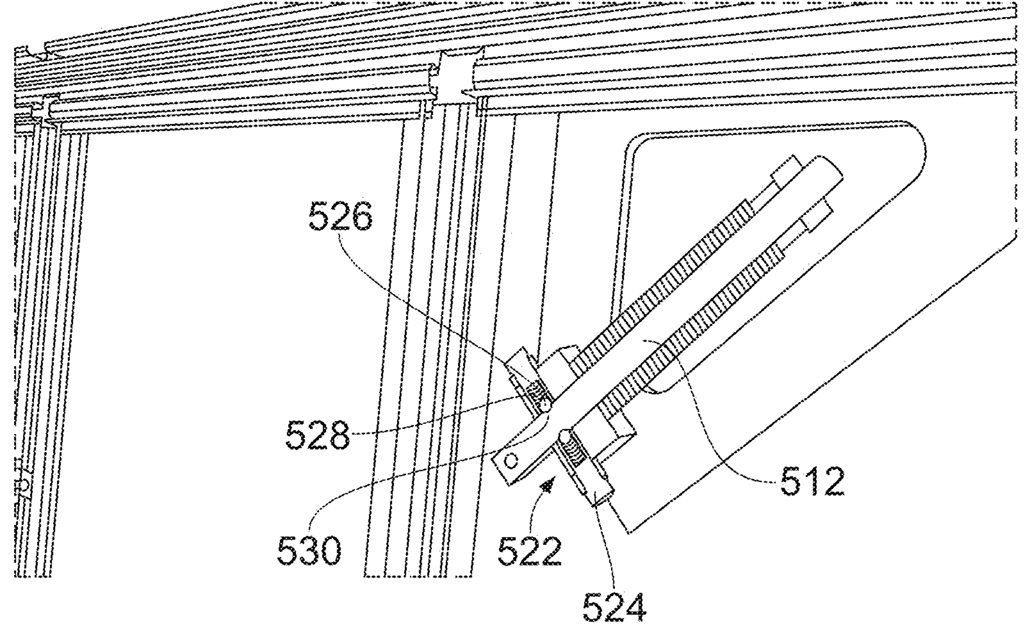
FIG. 13 is a cross section view of the structures from FIG. 12.

In one embodiment, shown in FIGS. 10 and 13, the releasable locking mechanism 522 comprises a detent, such as a spring loaded detent 524. According to one aspect the spring loaded detent 524 is a ball detent where a ball 526 is forced by a set spring 528 into a notch 530 in bolt 512. The set spring forces the ball into the notch with a predetermined force, preventing the bolt from moving longitudinally until the tension force transferred via the bracing member exceeds the force of the set spring. When the force of the set spring is exceeded, the bolt presses the ball back against its set spring, dislodging the ball from the notch and thereby allowing the bolt to move and compress the spring 514.

Figure 14:
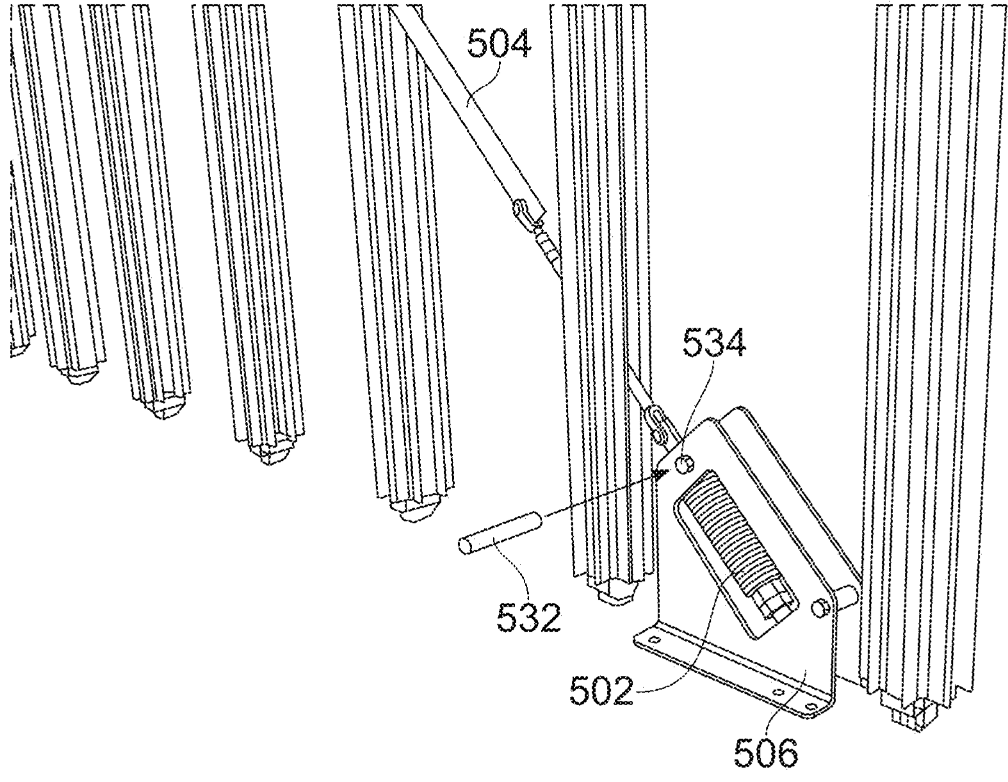
FIG. 14 is a perspective view of an embodiment of the tension limiter using a breakable pin.

According to another embodiment shown in FIG. 14, the locking mechanism is a breakable pin 532 with a predetermined breaking force that passes through a hole 534 that extends through damper frame 506 and bolt 512.

According one aspect, the threshold value for the locking mechanism, e.g., the amount of force required to dislodge the ball from the notch or to break the pin, is calculated based on the anticipated kinetic energy introduced by the normal operation of the vehicles operating in the automated storage and retrieval system. One skilled in the art is capable of calculating such kinetic energy by knowing the number of vehicles in operation, the weight of the vehicles, the rate of acceleration and deceleration of the vehicles, as well as other relevant parameters. According to one aspect, the threshold value is 500 N (Newtons).

According to one aspect, the damping arrangement of the invention dissipates energy according to the following formula E=F×S, where E is energy measured in Joules, F is force measured in Newtons, and S is stroke length of the bracing member, e.g.:

$$F=1000N\text{–Stroke}=5\text{ mm } E=5\text{ Joule}$$

$$F=1000N\text{–Stroke}=30\text{ mm } E=300\text{ Joule}$$

Twin-Post Upright Members

Figure 15:
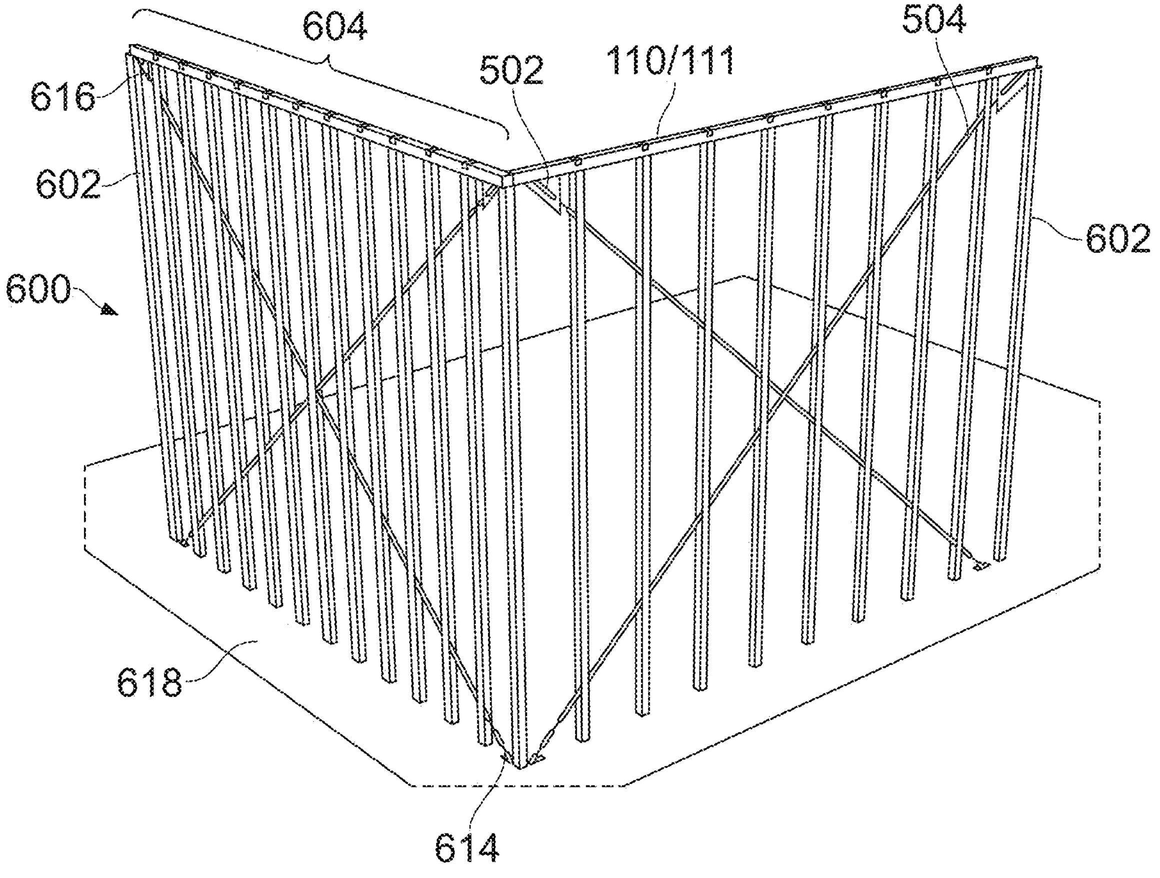
FIG. 15 is a perspective view of an embodiment of the bracing arrangement of the invention arranged along peripheral sides of a framework structure.

According to one aspect of the invention, the elongated bracing members 504 are arranged to pass through spaces in twin-post upright members 602 of a framework structure 100 of an automated storage and retrieval system. FIG. 15 illustrates the general principle of such twin-post upright members, showing two sides of a periphery 600 of a framework structure 100 of an automated storage and retrieval system 1. Interior upright members 102 and rail system 108 of the framework structure 100, such as illustrated in FIG. 1, are also not shown in FIG. 15 for ease of illustration. As shown, a plurality of twin-post upright members 602 are arranged in a row 604. In one aspect, row or rows 604 are arranged along at least one side, preferably along at least two sides, of periphery 600. According to another aspect, row or rows 604 may be arranged in the interior of framework structure 100.

Figure 16:
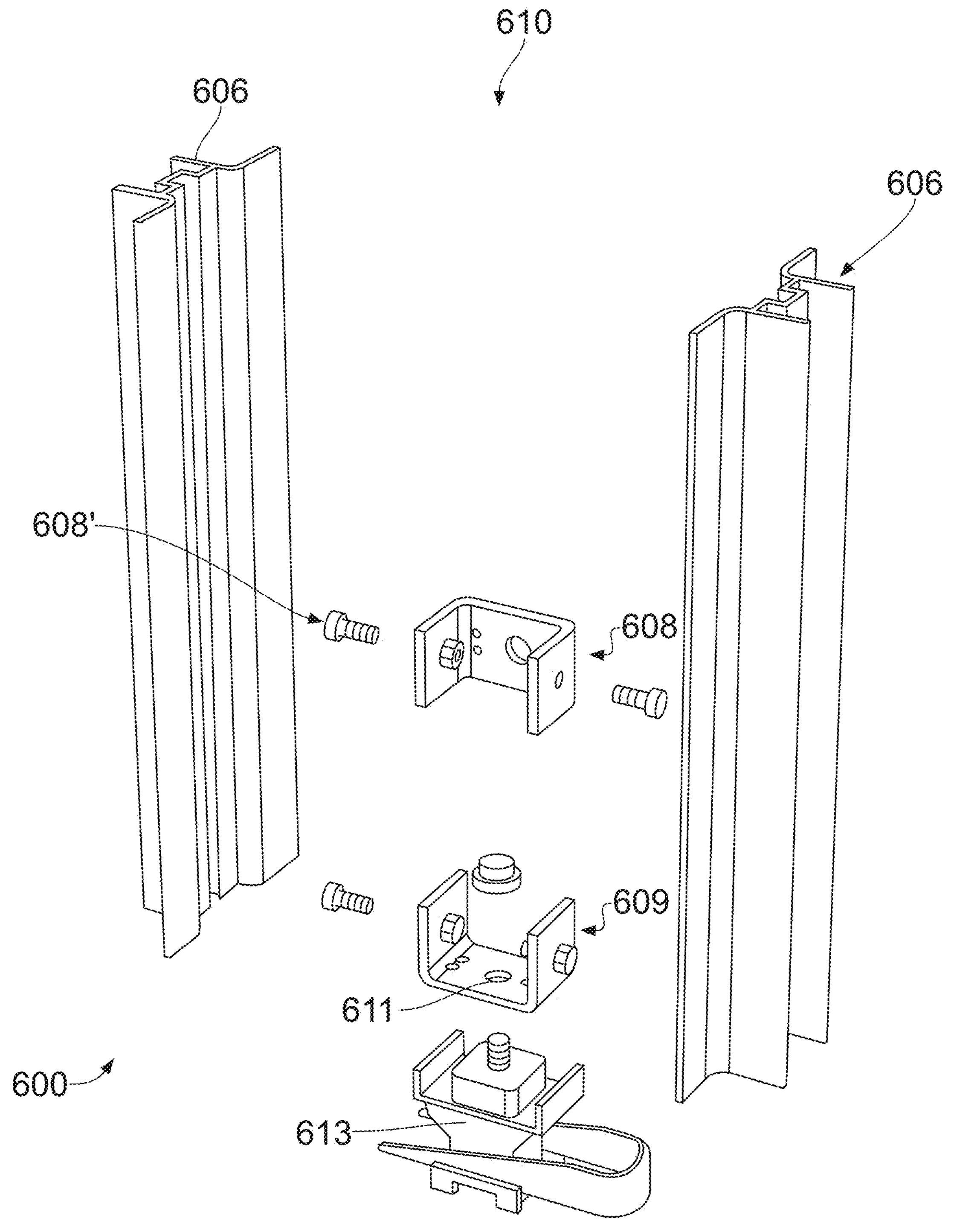
FIG. 16 is an exploded view of twin-post upright member together with a grid foot leveling device.

FIG. 16 is an exploded view of a twin-post upright member 602. As shown, the twin-post upright member 602 comprises vertical sections 606 joined together by one or more spacers 608 connected with bolts 608'. When so joined, a space 610 is created between vertical sections 606. In one aspect, a lowermost spacer 609 comprises a hole or slot 611 arranged to engage a leveling foot device 613.

Figure 17:
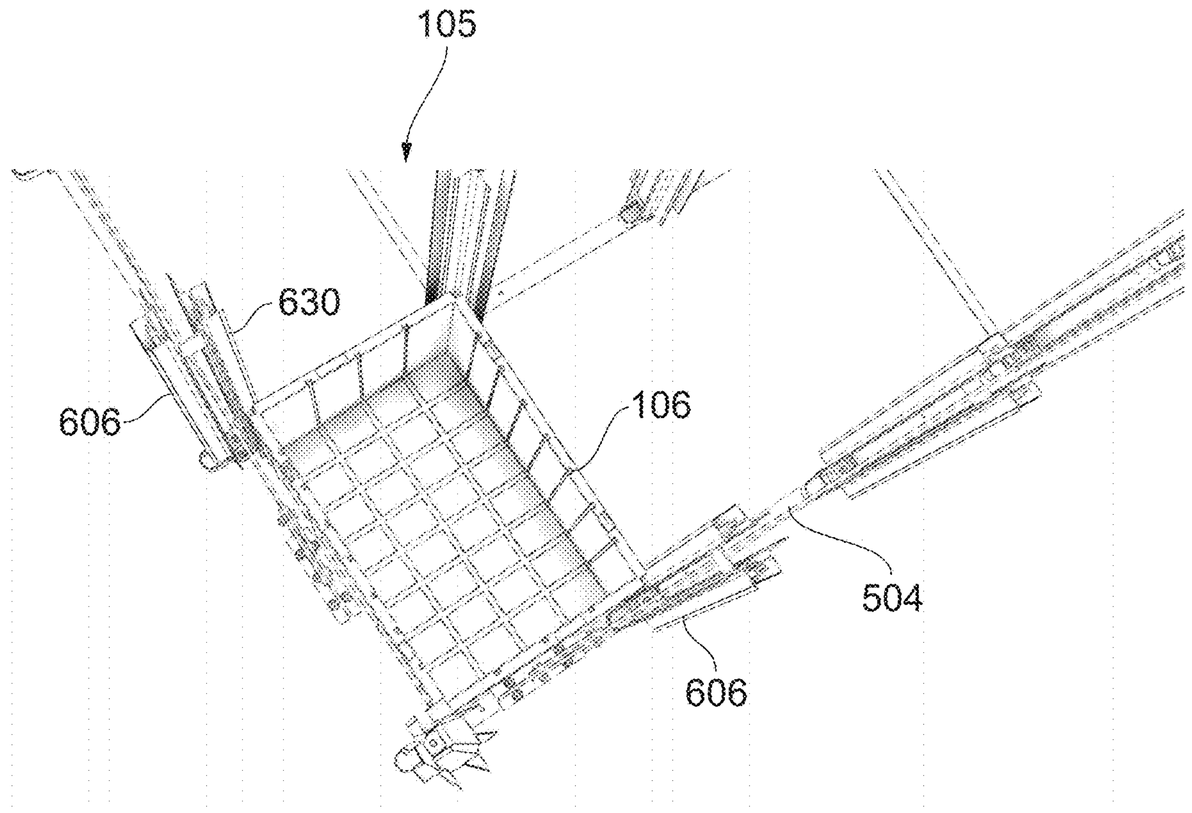
FIG. 17 is an overhead view showing a storage container with its corners being guided by corner guide profiles of a twin-post upright member.

FIG. 17 illustrates that vertical sections 606 may comprise elongated corner guide profiles 630 that have a shape adapted to receive and vertically guide the movement of corresponding corners of storage containers 106. When a twin-post upright member 602 comprises one of the four upright members that define a storage column (that may include prior art upright members 102), the corner guide profiles 630 will cooperate with similar corner guide profiles of the remaining upright members to form a vertical guide path for the storage container, free from interference from the elongated bracing member 504.

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

Prior Art (FIGS. 1-4):

1 Prior art automated storage and retrieval system
100 Framework structure
102 Upright members of framework structure
104 Storage grid
105 Storage column
106 Storage container
106' Particular position of storage container
107 Stack
108 Rail system
110 Parallel rails in first direction (X)
112 Access opening
119 First port column
120 Second port column
201 Prior art container handling vehicle
**201*a* Vehicle body of the container handling vehicle 201**
**201*b*** Drive means/wheel arrangement/first set of wheels in first direction (X)
**201*c*** Drive means/wheel arrangement/second set of wheels in second direction (Y)
301 Prior art cantilever container handling vehicle
**301*a* Vehicle body of the container handling vehicle 301**
**301*b*** Drive means/first set of wheels in first direction (X)
**301*c*** Drive means/second set of wheels in second direction (f)
304 Gripping device
401 Prior art container handling vehicle
**401*a* Vehicle body of the container handling vehicle 401**
**401*b*** Drive means/first set of wheels in first direction (X)
**401*c*** Drive means/second set of wheels in second direction (f)
404 Gripping device
**404*a*** Lifting band
**404*b*** Gripper
**404*c*** Guide pin
**404*d*** Lifting frame
500 Control system
X First direction
Y Second direction
Z Third direction
502 Damper mechanism
504 Elongated bracing member
506 Damper frame
508 Connection point
510 Connection bracket
512 Bolt
514 Spring
516 Shoulder
518 Swivel joint
519 turnbuckle
520 Tension limiter
524 Spring loaded detent
526 Ball
528 Set spring
530 Notch
532 Breakable pin
534 hole
600 Periphery
602 Twin-post upright member
604 Row
606 Upright member sections
608 Spacers
610 Space
611 Hole or slot
613 Leveling foot device
630 Corner guide profile

The invention claimed is:

1. A bracing arrangement for a framework structure of an automated storage and retrieval system, the framework structure comprising a rail system arranged at an upper level of the framework structure, wherein the bracing arrangement comprises:

an elongated, rigid bracing member configured to be coupled at one end to the framework structure, at or near an upper level of the framework structure and at an opposite end to a grounding point;

a damping mechanism connected to an end of the bracing member, the damping mechanism arranged to respond to forces from lateral movement in the upper level of the framework structure transferred to the damping mechanism via the elongated bracing member, the damping mechanism further comprising a releasable locking mechanism which isolates the damping mechanism until a threshold tension value exerted on the releasable locking mechanism via the bracing member is exceeded, such that after the threshold tension value is exceeded the releasable locking mechanism is tripped allowing the damping mechanism to dissipate kinetic energy from lateral movement of the upper level of the framework structure, wherein a normal operation of a vehicle on the rail system does not trip the releasable locking mechanism.

2. The bracing arrangement according to claim 1, wherein the damping mechanism comprises a spring that is compressible and extendable in a longitudinal direction of the bracing member, the compression of the spring being responsive to tension forces transferred to the spring via the elongated member in response to lateral movement of an upper part of the framework structure, and wherein the releasable locking mechanism is part of a tension limiter arranged to prevent the spring of the damping mechanism from extending or contracting until the threshold tension value is exceeded.

3. The bracing arrangement according to claim 1, wherein the damping mechanism comprises a longitudinally movable bolt connected to an end of the elongated bracing member, the bolt arranged to compress a spring.

4. The bracing arrangement according to claim 1, wherein the releasable locking mechanism comprises a spring loaded detent arranged to engage a notch in a bolt, the spring loaded detent arranged to disengage from the bolt when the threshold tension value is exceeded.

5. The bracing arrangement according to claim 4, wherein the detent comprises a ball biased into the notch by a set spring.

6. The bracing arrangement according claim 1, wherein the releasable locking mechanism comprises a breakable pin arranged to engage a bolt, the pin arranged to break when the threshold tension value is exceeded.

7. The bracing arrangement according to claim 1, wherein the threshold tension value is calculated based on an expected kinetic energy imparted on the framework structure from normal operation of vehicles on the rail system.

8. The bracing arrangement according to claim 7, wherein the threshold tension value is 500 N.

9. The bracing arrangement according to claim 1, wherein the bracing member is arranged diagonally, attached at its upper end to the upper level of the framework structure and attached at its lower end to a grounding point on floor of a facility housing the automated storage and retrieval system.

10. The bracing arrangement according to claim 9, wherein there are at least two bracing members, each arranged diagonally, attached at their upper ends to the upper level of the framework structure and attached at their lower ends to grounding points on the floor of the facility housing automated storage and retrieval system such that two such members cross to form an "X" pattern.

11. The bracing arrangement according to claim 1, wherein the framework structure comprises:

a. a plurality of twin-post upright members arranged in at least one row of the framework structure, the twin-post upright members comprising a pair of upright member sections arranged with a space therebetween, b. wherein each elongated bracing member is arranged to pass through the spaces between vertical sections of the pairs of upright member sections of the plurality of twin-post upright members arranged in the at least one row.

12. The bracing arrangement according to claim 11, wherein at least one row is arranged at a periphery of the framework structure.

13. The bracing arrangement according to claim 11, wherein the twin-post upright members comprise a pair of upright member sections separated by spacers, so as to create a space between the upright member sections, the upright member sections further comprising elongated corner guide profiles arranged to vertically guide a container in a storage column defined by four upright members.

14. A method for bracing an automated storage and retrieval system having automated vehicles operating on a rail system at an upper level of a framework structure, the method comprising:

a. connecting an elongated bracing member at one end to an upper level of the framework structure and at an opposite end to a grounding point, b. connecting a damper mechanism to an end of the elongated bracing member, the damper mechanism arranged to dissipate kinetic energy associated with lateral movement of the upper level of the framework structure, said lateral movement exerting forces in a longitudinal direction of the bracing member, which are transferred to the damper mechanism via the bracing member, c. providing a releasable locking mechanism in connection with the damper mechanism, the releasable locking mechanism comprising a breakable pin arranged to engage a bolt, the pin arranged to break when a threshold tension value is exceeded, the releasable locking mechanism arranged to isolate the damper mechanism until a force is exerted on the releasable locking mechanism via the bracing member which exceeds the threshold tension value, whereafter the releasable locking mechanism is tripped and the damper mechanism is permitted to dissipate the kinetic energy, and d. calculating the threshold tension value based on an expected kinetic energy imparted on the framework structure from normal operation of the vehicles of the system, wherein a normal operation of one of the vehicles does not trip the releasable locking mechanism.

15. The method according to claim 14, wherein the damper mechanism is a friction damper.

16. The method according to claim 14, wherein the force exerted on the releasable locking mechanism is a tensile force transferred via the bracing member.

17. The method according to claim 14, wherein the elongated bracing member is arranged to pass through spaces in a plurality of twin-post upright members.

18. The method according to claim 14, wherein a bracing arrangement permits the framework structure to be self-standing, without a need to brace the framework structure to walls of a facility.

* * * * *